Dec. 8, 1925.

J. SCHWARTZ

SAFETY HOOK

Filed Sept. 15, 1924

1,564,900

Inventor
Jesse Schwartz,

Witness:
Fred C. Fischer.

By F. G. Fischer,
Attorney

Patented Dec. 8, 1925.

1,564,900

UNITED STATES PATENT OFFICE.

JESSE SCHWARTZ, OF KANSAS CITY, MISSOURI.

SAFETY HOOK.

Application filed September 15, 1924. Serial No. 737,896.

*To all whom it may concern:*

Be it known that I, JESSE SCHWARTZ, a citizen of the United States, residing at Kansas City, in the county of Jackson and State of Missouri, have invented certain new and useful Improvements in Safety Hooks, of which the following is a specification.

My invention relates to safety hooks and my principal object is to provide a hook over which one link of a chain can be easily engaged or disengaged by hand, but is not likely to become accidentally disengaged while in service.

While the device may be employed to advantage on a variety of implements it is especially useful when applied to power shovels employed in unloading grain cars. Said shovels are usually operated in pairs, one from each end of a grain car, and are drawn forwardly by draft cables attached to chains engaged over hooks on the shovels. As the cables cross each other the cables of one shovel, at times engages under one of the links hooked to the other shovel and disengages said link, thereby putting both shovels out of operation and causing loss of valuable time. At times one cable also gets caught between one of the links and hooks of the other shovel and thus becomes damaged to such an extent as to soon become useless, thereby resulting in a loss of time and cable.

By employing my hooks delay from the causes above referred are not likely to occur as it is almost impossible for the accidents above-mentioned to happen.

In order that the invention may be fully understood, reference will now be had to the accompanying drawing in which.

Figure 1:
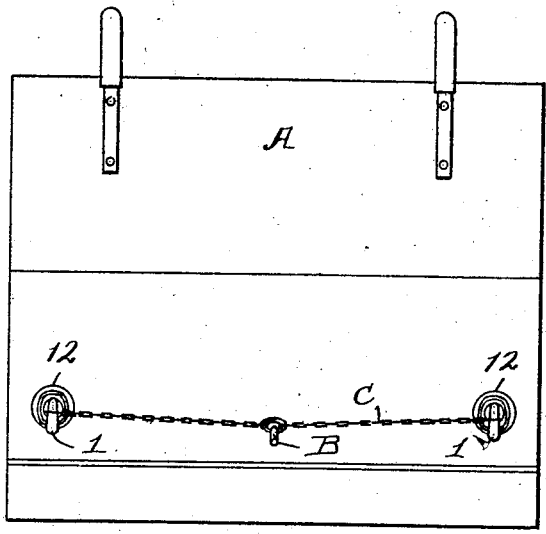
Fig. 1 is a front elevation of a power shovel equipped with my devices.
Figure 2:
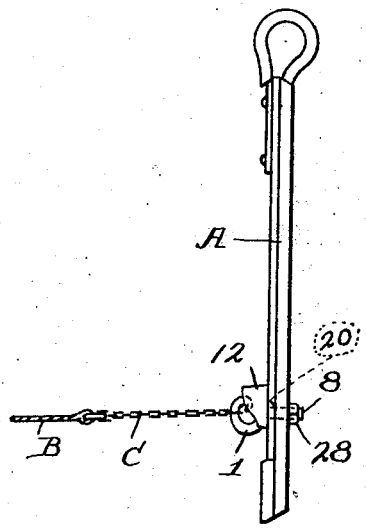
Fig. 2 is a side elevation of the parts disclosed by Fig. 1.
Figure 3:
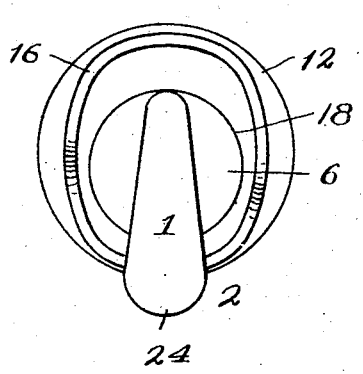
Fig. 3 is an enlarged detail front elevation of one of the devices.
Figure 4:
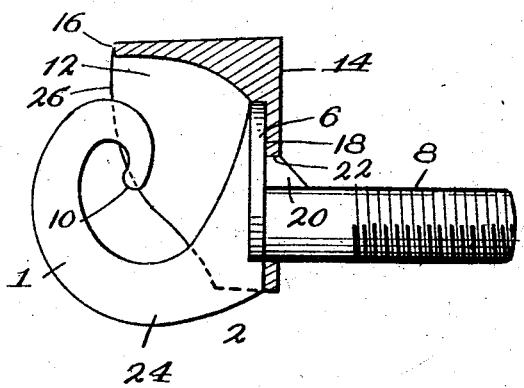
Fig. 4 is a vertical longitudinal section on line IV—IV of Fig. 3.

Referring now in detail to the different parts, A, designates a shovel such as is commonly employed in unloading grain cars. Said shovel A, is equipped with the usual draft cable B and chain C, the end links of which latter are engaged over hooks 1 on members 2 constituting parts of the present invention. Each member 2 consists of the hook 1, a base 6 formed integral with one end of said hook, and a threaded shank 8 fixed to the opposite side of the base 6 from which said hook 1 projects. The hook 1 extends forwardly from the base 2 and is curved upwardly and rearwardly and ends in an inwardly turned terminal 10.

12 designates a shield which cooperates with the hook 1 in holding the co-engaging link of the chain C from accidental displacement. Said shield 12 consists of a base 14 and a rim 16. The base 14 has a recess 18 in which the base 6 of the member 2 snugly fits, it being prevented from turning by an integral lug 20 which extends through a corresponding slot 22 in the base 14. Said lug 20 also projects into the body of the shovel A and prevents the shank 8 from turning with the nut 28 when the same is screwed up.

The rim 16 partially surrounds and tapers towards the enlarged portion 24 of the hook 1, while its widest portion 26 extends over the terminal 10. The upper portion and sides of the rim 12 are spaced far enough from the adjacent portions of the hook 1 to permit the link of the chain C to be engaged with and disengaged manually from said hook 1, but when in engagement it is almost impossible for the link to become accidently disengaged owing to the protective rim 16. The rim 16 also prevents the draft cable of the opposing shovel from dislodging said link or getting under the associate hook, and becoming damaged.

The members 2 and the shields 12 on being assembled are readily secured to the shovel A by passing the shanks 8 through corresponding holes in the shovel and tightening up the units 21.

From the foregoing description it is apparent that I have provided a relatively simple and inexpensive device embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. A device of the character described consisting of a base, a rim projecting from said base, a hook partially surrounded by said rim, a base fixed to said hook and removably seated in the first-mentioned base, and a threaded shank projecting from the second base through a hole in the first base.

2. A device of the character described consisting of a base, a rim projecting from said base, a hook partially surrounded by said rim, a base fixed to said hook and removably seated in the first-mentioned base, a shank projecting from the second base through a hole in the first base, and coengaging means on said bases to prevent independent rotation thereof.

3. A device of the character described consisting of a base, a shank projecting from one side of said base, a hook projecting from the opposite side of said base and curved upwardly and rearwardly and thence downwardly to approximately parallel its upwardly curved portion, and a shield separable from said hook having a hole for the passage of said shank, a recess to receive said base, and a rim surrounding the top and sides of the upper rearwardly and downwardly curved portion of said hook.

In testimony whereof I affix my signature.

JESSE SCHWARTZ.